United States Patent
Seo et al.

(10) Patent No.: US 9,768,926 B2
(45) Date of Patent: Sep. 19, 2017

(54) METHOD AND APPARATUS FOR RECEIVING CONTROL INFORMATION IN WIRELESS COMMUNICATION SYSTEM

(71) Applicant: LG ELECTRONICS INC., Seoul (KR)

(72) Inventors: Inkwon Seo, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 34 days.

(21) Appl. No.: 14/772,603

(22) PCT Filed: Mar. 4, 2014

(86) PCT No.: PCT/KR2014/001770
§ 371 (c)(1),
(2) Date: Sep. 3, 2015

(87) PCT Pub. No.: WO2014/137138
PCT Pub. Date: Sep. 12, 2014

(65) Prior Publication Data
US 2016/0013904 A1   Jan. 14, 2016

Related U.S. Application Data

(60) Provisional application No. 61/772,528, filed on Mar. 4, 2013.

(51) Int. Cl.
*H04W 72/04* (2009.01)
*H04L 5/00* (2006.01)
(Continued)

(52) U.S. Cl.
CPC ........ *H04L 5/0048* (2013.01); *H04L 25/0236* (2013.01); *H04W 74/006* (2013.01)

(58) Field of Classification Search
CPC ..... H04L 5/0048; H04L 25/0236; H04L 5/00; H04L 27/28; H04W 74/006; H04W 28/06;
(Continued)

(56) References Cited

U.S. PATENT DOCUMENTS

2012/0263247 A1   10/2012   Bhattad et al.
2013/0044727 A1*  2/2013   Nory ............... H04L 5/0092
                                                370/330
(Continued)

FOREIGN PATENT DOCUMENTS

JP       2012-235360 A        11/2012
KR    10-2009-0116220 A       11/2009
(Continued)

Primary Examiner — Lakeram Jangbahadur
(74) Attorney, Agent, or Firm — Birch, Stewart, Kolasch & Birch, LLP

(57) ABSTRACT

Disclosed is a method for receiving control information, one embodiment of the present invention, in which a terminal receives control information by means of an enhanced physical downlink control channel (EPDCCH) in a wireless communication system, comprising the steps of: estimating a channel in subframe N, and blind-decoding on the basis of the result of the channel estimation; and blind-decoding in subframe N+L (L>=1), wherein, if subframe N and subframe N+L are included in a single subframe bundling group (SBG), then the reference signal associated with the channel estimation in subframe N is also used for the channel estimation for blind-decoding in subframe N+L.

12 Claims, 11 Drawing Sheets

(a)

(b)

(51) Int. Cl.
*H04L 25/02* (2006.01)
*H04W 74/00* (2009.01)

(58) Field of Classification Search
CPC ....... H04W 52/02; H04W 72/04; H04J 11/00;
H04B 7/26; H04B 15/00
See application file for complete search history.

(56) References Cited

U.S. PATENT DOCUMENTS

2014/0044056 A1* 2/2014 Chen .................... H04W 72/04
370/329
2014/0301286 A1* 10/2014 Abe ..................... H04L 5/0023
370/329

FOREIGN PATENT DOCUMENTS

KR 10-2013-0007928 A 1/2013
WO WO 2013/025302 A1 2/2013

\* cited by examiner

FIG. 5
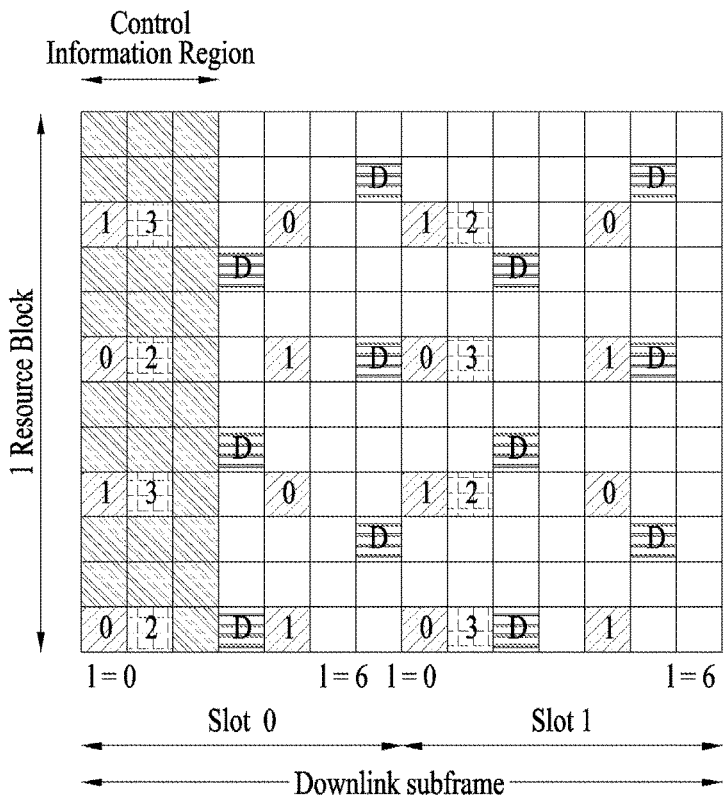
(a)
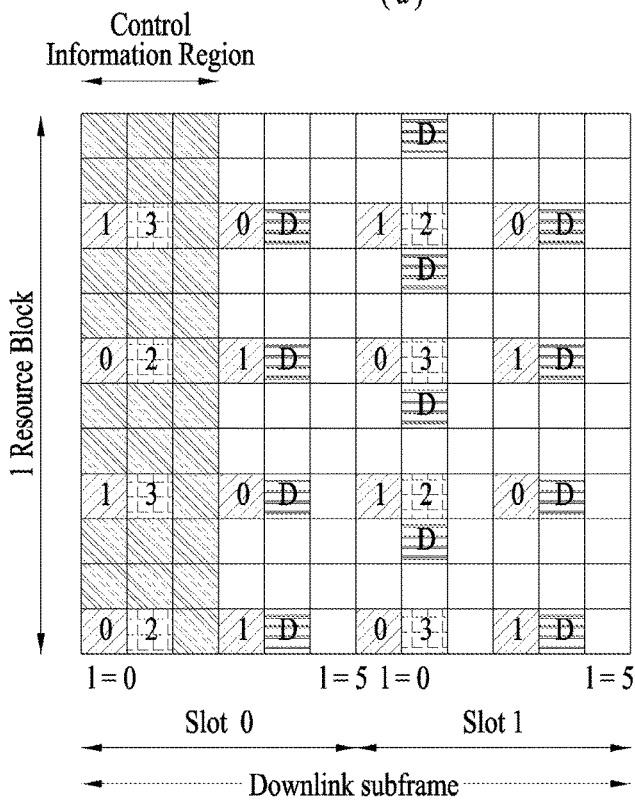
(b)

FIG. 8

METHOD AND APPARATUS FOR RECEIVING CONTROL INFORMATION IN WIRELESS COMMUNICATION SYSTEM

CROSS REFERENCE TO RELATED APPLICATIONS

This application is the National Phase of PCT International Application No. PCT/KR2014/001770, filed on Mar. 4, 2014, which claims priority under 35 U.S.C. 119(e) to U.S. Provisional Application No. 61/772,528, filed on Mar. 4, 2013, all of which are hereby expressly incorporated by reference into the present application.

TECHNICAL FIELD

The present invention relates to a wireless communication system, and more particularly, to a method of receiving control information through EPDCCH (enhanced physical downlink channel) and apparatus therefor.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi carrier frequency division multiple access (MC-FDMA) system, etc.

DISCLOSURE OF THE INVENTION

Technical Task

The technical task of the present invention is to provide channel estimation through subframe bundling and a method of receiving control information based on the channel estimation through the subframe bundling.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of receiving control information, which is received through EPDCCH (enhanced physical downlink control channel) by a user equipment in a wireless communication system, including the steps of performing channel estimation on a subframe N, performing blind decoding based on a result of the channel estimation and performing the blind decoding on a subframe (N+L) (where, L>=1), wherein if the subframe N and the subframe (N+L) are included in one subframe bundling group (SBG), a reference signal related to the channel estimation in the subframe N is also used for the channel estimation for the blind decoding in the subframe (N+L).

In a $2^{nd}$ technical aspect of the present invention, provided herein is a user equipment in receiving control information through EPDCCH (enhanced physical downlink channel) in a wireless communication system, including a receiving module and a processor performing channel estimation in a subframe N, the processor performing blind decoding based on a result of the channel estimation, the processor performing the blind decoding on a subframe (N+L) (where, L>=1), wherein if the subframe N and the subframe (N+L) are included in one subframe bundling group (SBG), a reference signal related to the channel estimation in the subframe N is also used for the channel estimation for the blind decoding in the subframe (N+L).

At least one of the following matters may be included in the $1^{st}$ to $2^{nd}$ technical aspects of the present invention.

Preferably, the user equipment may assume that a position of an EPDCCH candidate in the subframe N is identical to that in the subframe (N+L).

Preferably, starting positions of EPDCCH candidates in the subframe N and the subframe (N+L) may be randomized by a value related to the SBG.

More preferably, the starting positions of the EPDCCH candidates may be identical in the SBG.

More preferably, $Y_{p,k}$ related to the starting positions of the EPDCCH candidates is determined by a formula: $Y_{p,k}=(A_p \cdot Y_{p,k-1}) \bmod D$, where $k=\lfloor n_s/(2 \times SBG_{size})\rfloor$, $Y_{p,-1}=n_{RNTI} \neq 0$, $A_0=39827$, $A_1=39829$, $D=65537$, $n_s$ is a slot number, and $SBG_{size}$ may be a size of the SBG.

More preferably, $Y_{p,k}$ related to the starting positions of the EPDCCH candidates is determined by a formula: $Y_{p,k}=(A_p \cdot Y_{p,k-1}) \bmod D$, where $k=SBG_{index}$, $Y_{p,-1}=n_{RNTI} \neq 0$, $A_0=39827$, $A_1=39829$, $D=65537$, $n_s$ is a slot number, and $SBG_{index}$ may be an index of the SBG in a subframe bundling performed interval.

Further preferably, if a frame including a $1^{st}$ subframe of the SBG is changed, the $SBG_{index}$ may be reset to 0.

Preferably, if bundling is performed in the subframe bundling group by a unit of a DCI (downlink control information) detected PRB (physical resource block) pair, the result of the channel estimation in the subframe N may be applied to only the PRB pair in the subframe N+L corresponding to the DCI detected PRB pair in the subframe N.

Preferably, if bundling is performed in the subframe bundling group by a unit of a DCI detected ECCE (enhanced control element), the result of the channel estimation in the subframe N may be applied to only the ECCE in the subframe (N+L) corresponding to the DCI detected ECCE in the subframe N.

More preferably, if the DCI is not detected from the ECCE of the subframe (N+L), the user equipment may consider that there is no DCI for the user equipment.

Preferably, the method of receiving the control information may further include the step of receiving information related to subframe bundling.

More preferably, the information related to the subframe bundling may include at least one selected from the group consisting of presence or non-presence of the subframe bundling, a size of the subframe bundling group, and information on time-frequency domain on which the subframe bundling is performed.

Advantageous Effects

According to the present invention, data transfer rate can be improved without a significant decrease in accuracy of channel estimation through subframe bundling.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram to describe a reference signal.

FIG. 8 is a diagram to describe EREG-to-ECCE mapping.

BEST MODE FOR INVENTION

Figure 1:
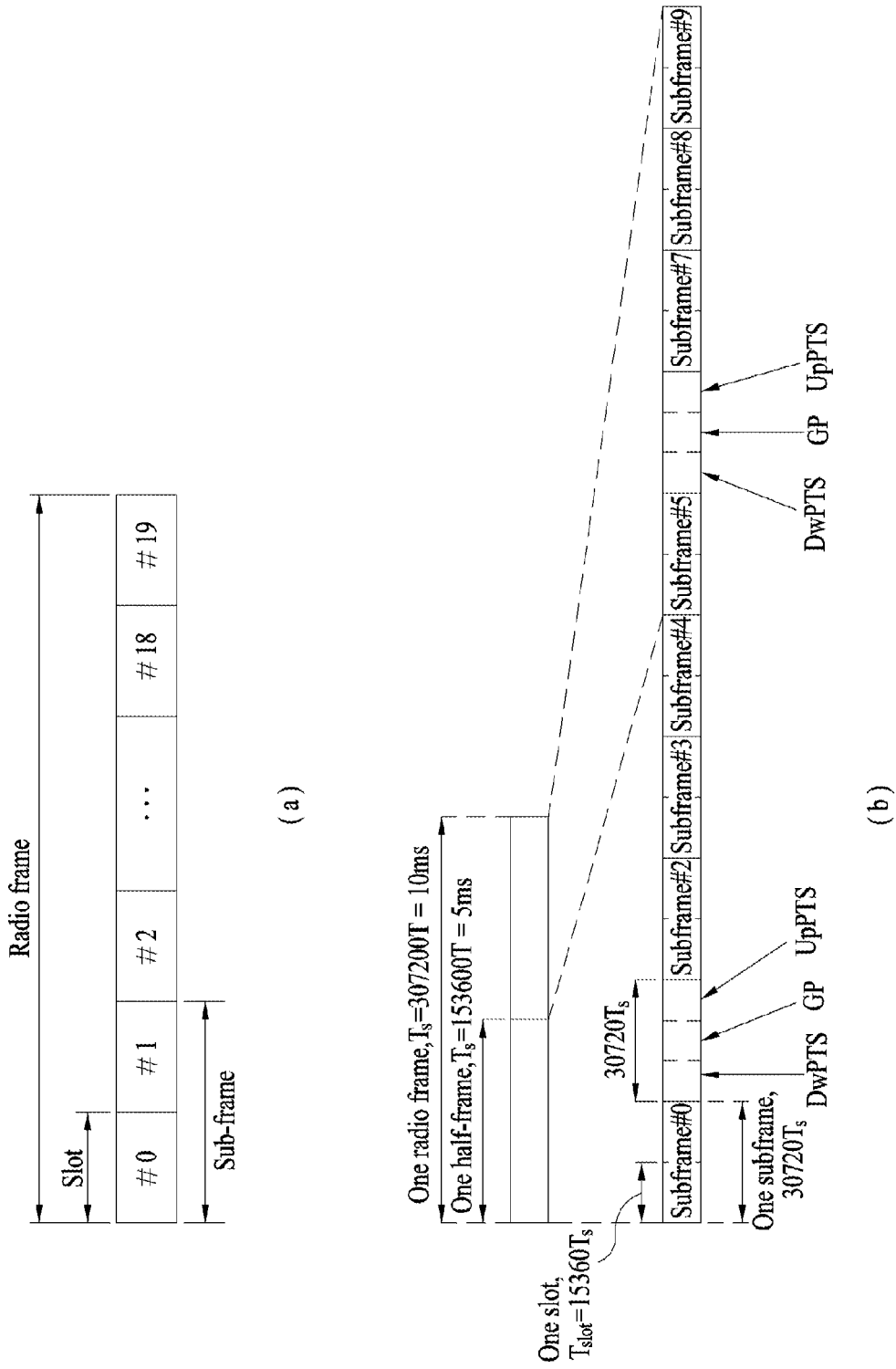
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
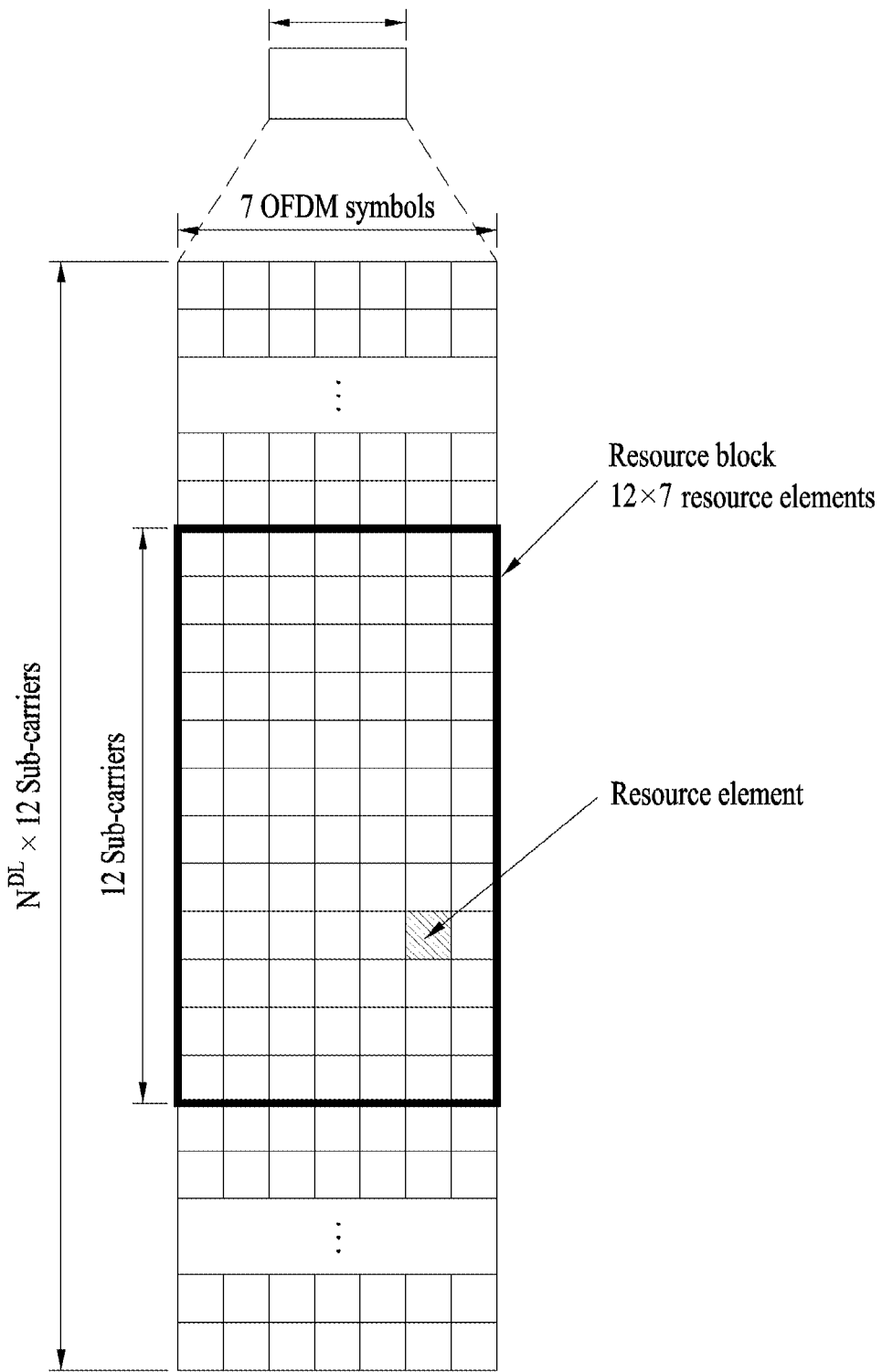
FIG. 2 is a diagram of a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
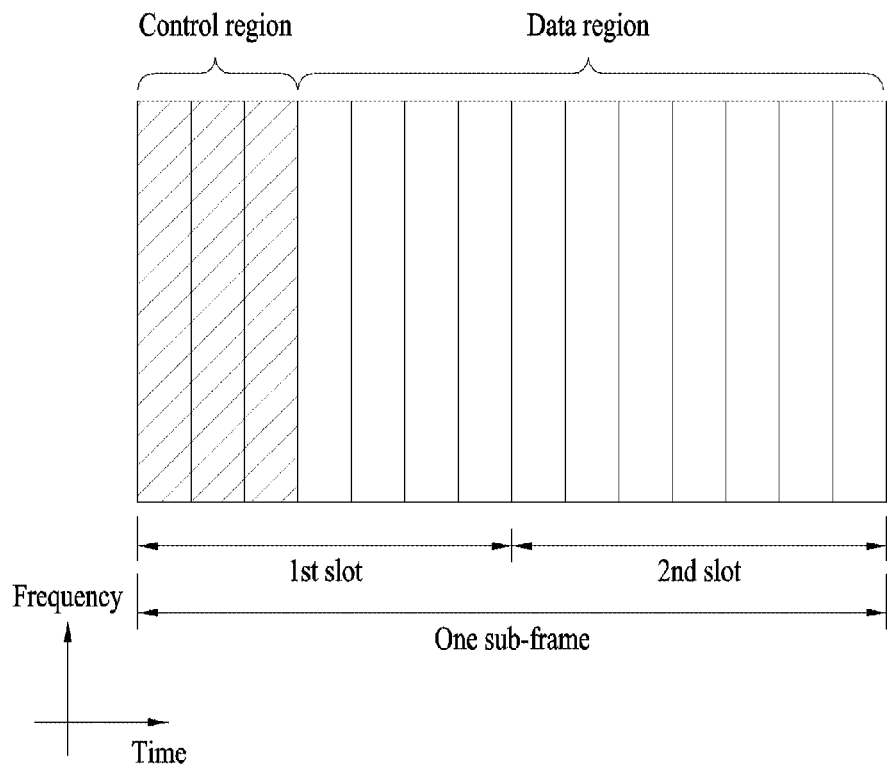
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
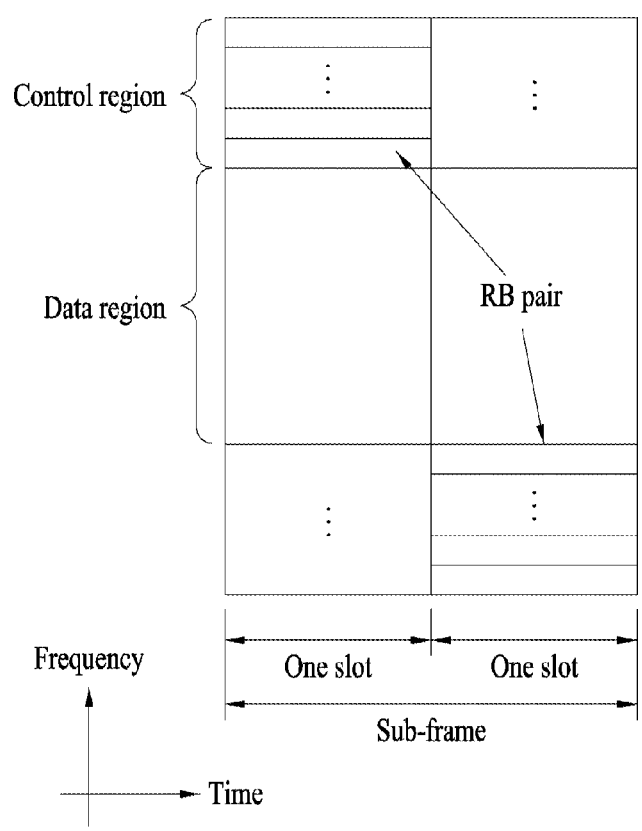
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(*a*)) and 12 OFDM symbols in time in the case of the extended CP (see FIG. 5(*b*)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

Demodulation Reference Signal (DMRS)

DMRS means a reference signal defined for the purpose of channel estimation for PDSCH in a user equipment. The DMRS may be used in transmission modes 7, 8 and 9. Although the DMRS had been initially defined for single layer transmission of an antenna port 5, the DMRS has been enlarged for spatial multiplexing of maximum 8 layers. The DMRS is transmitted for a specific user equipment only as will be aware of it from the UE-specific reference signal which is another name of the DMRS. Therefore, the DMRS may be transmitted in RB in which PDSCH for the specific user equipment is transmitted.

Figure 6:
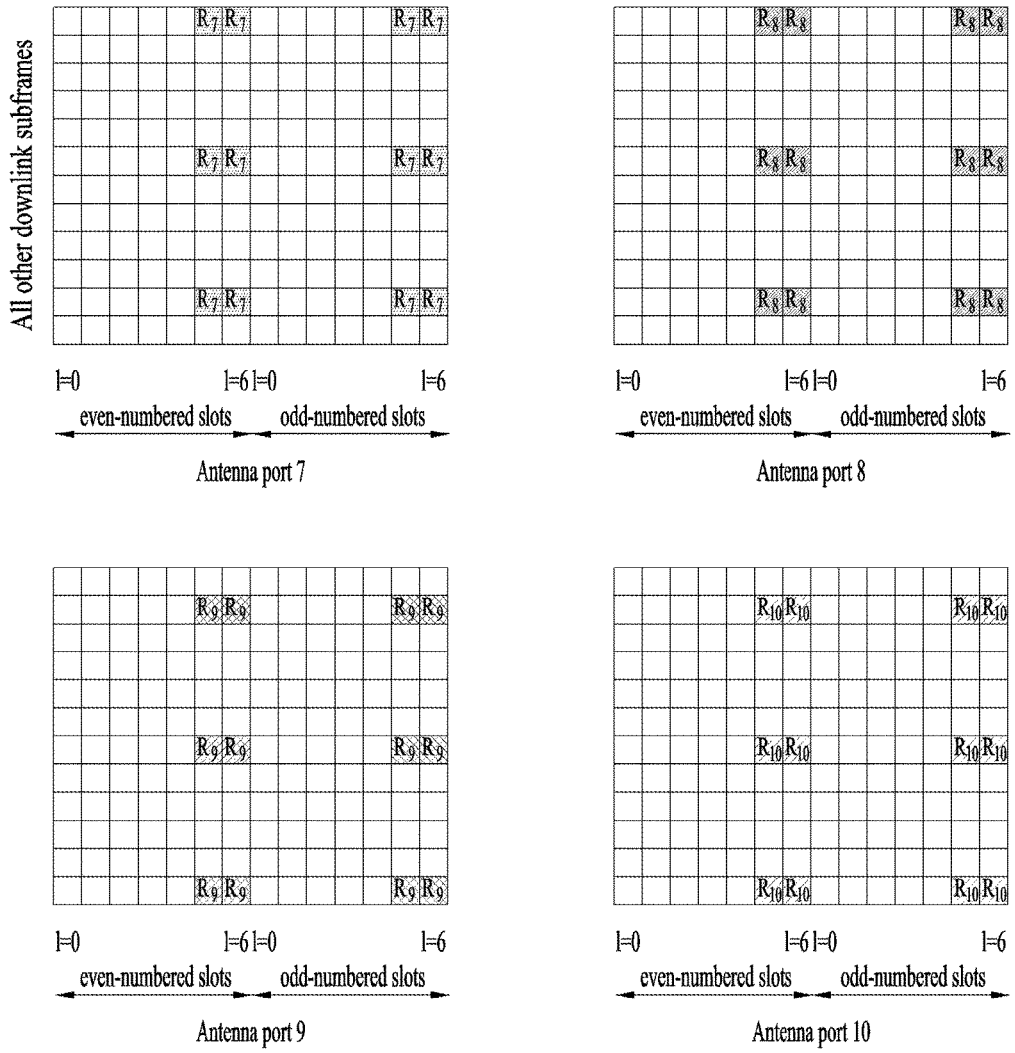
FIG. 6 is a diagram to describe a demodulation reference signal.

Generation of the DMRS for maximum 8 layers will be described as follows. The DMRS may be transmitted in a manner that a reference signal sequence r(m) generated in accordance with the following Formula 1 is mapped to a complex-valued modulation symbol $a_{k,l}^{(p)}$ in accordance with the following Formula 2. FIG. 6 shows that the DMRS is mapped to a resource grid on a subframe in accordance with the Formula 2 in case of normal CP and relates to antenna ports 7 to 10.

$$r(m) = \frac{1}{\sqrt{2}}(1 - 2 \cdot c(2m)) + j\frac{1}{\sqrt{2}}(1 - 2 \cdot c(2m+1)), \quad \text{[Formula 1]}$$

$$M = \begin{cases} 0, 1, \ldots, 12\, N_{RB}^{max,DL} - 1 & \text{normal } CP \\ 0, 1, \ldots, 16\, N_{RB}^{max,DL} - 1 & \text{extended } CP \end{cases}$$

In the Formula 1, the r(m) means a reference signal sequence, c(i) means a pseudo-random sequence, and $N_{RB}^{max,DL}$ means the number of maximum RBs of a downlink bandwidth.

[Formula 2]

$$a_{k,l}^{(p)} = w_p(l') \cdot r(3 \cdot l' \cdot N_{RB}^{max,DL} + 3 \cdot n_{PRB} + m')$$

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{SC}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{in case of } specail \text{ subframe} \\ & \text{configuration } 3, 4, 8 \text{ or } 9 \\ l' \bmod 2 + 2 + 3[l'/2] & \text{in case of } specail \text{ subfrane} \\ & \text{configuration } 1, 2, 6 \text{ or } 7 \\ l' \bmod 2 + 5 & \text{in case of non special } subfame \end{cases}$$

$$l' = \begin{cases} 0, 1, 2, 3 & n_S \bmod 2 = 0 \text{ and in case of special subframe} \\ & \text{configuration } 1, 2, 6 \text{ or } 7 \\ 0, 1 & n_S \bmod 2 = 0 \text{ and in case of non special} \\ & \text{subframe configuration } 1, 2, 6 \text{ or } 7 \\ 2, 3 & n_S \bmod 2 = 1 \text{ and in case of non special} \\ & \text{subframe configuration } 1, 2, 6 \text{ or } 7 \end{cases}$$

$$m' = 0, 1, 2$$

As can be seen from Formula 2, an orthogonal sequence $\overline{w}_p$ (i) as shown in Table 1 below is applied in accordance with an antenna port when the reference signal sequence is mapped to a complex modulation symbol.

TABLE 1

| Antenna port p | [$\overline{w}_p(0)\ \overline{w}_p(1)\ \overline{w}_p(2)\ \overline{w}_p(3)$] |
|---|---|
| 7 | [+1 +1 +1 +1] |
| 8 | [+1 −1 +1 −1] |
| 9 | [+1 +1 +1 +1] |

TABLE 1-continued

| Antenna port p | [$\overline{w}_p(0)$ $\overline{w}_p(1)$ $\overline{w}_p(2)$ $\overline{w}_p(3)$] |
| --- | --- |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

In case that a spreading factor corresponds to 2, a user equipment may despread each of DMRS in a $1^{st}$ slot and DMRS in a $2^{nd}$ slot using the spreading factor of 2 and then perform channel estimation through time interpolation. In case that the spreading factor corresponds to 4, DMRS may be despread in an entire subframe using the spreading factor of 4 to perform the channel estimation.

The channel estimation based on the above-mentioned spreading factor is advantageous in the following aspects. In case that the spreading factor corresponds to 2, a gain may be obtained by applying the time interpolation with high mobility. Moreover, a gain may be obtained in decoding time by performing dispreading using the DMRS of the $1^{st}$ slot. In case that the spreading factor corresponds to 4, a larger number of user equipments or ranks may be supported.

Figure 7:
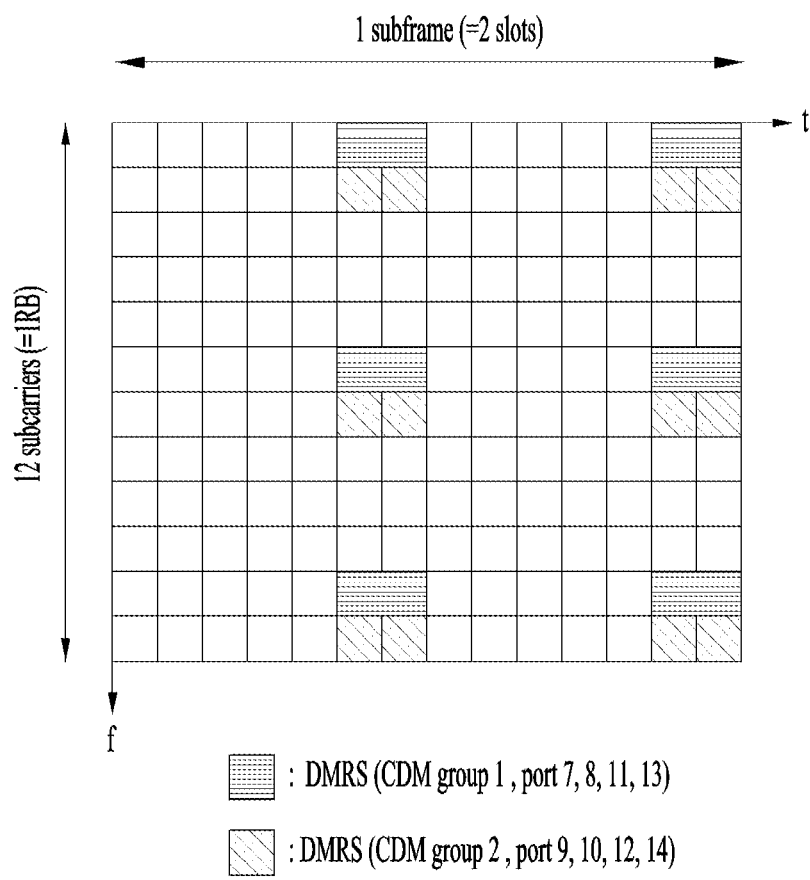
FIG. 7 is a diagram to describe a code division multiplexing (CDM) group.

DMRS overhead will be described with reference to FIG. 7. FIG. 7 shows mapping of DMRS for each of antenna ports 7 to 14 onto a subframe. As shown in FIG. 7, DMRSs may be divided into code divisional multiplexing (CDM) group 1 (or 1st antenna port set) and CMD group 2 (or 2nd antenna port set) according to locations of a resource grid to which the DMRSs are mapped. The DMRSs are transmitted through antenna ports 7, 8, 11 and 13 in REs corresponding to the CDM group 1 and the DMRSs are transmitted through antenna ports 9, 10, 12 and 14 in REs corresponding to the CDM group 2. In particular, in case of antenna ports included in one CDM group, the DMRSs are transmitted in the same REs. If the DMRSs are transmitted only using the antenna ports corresponding to the CDM group 1, resources necessary for the DMRSs are 12 REs, i.e., DMRS overhead corresponds to 12. Similarly, if the antenna ports corresponding to COM group 2 are used, the DMRS overhead corresponds to 24.

Enhanced PDCCH (EPDCCH)

In an LTE system after Release 11, an enhanced-PDCCH (EPDCCH), which may be transmitted through an existing PDSCH region, is considered as solutions for lack of capacity of PDCCH caused by CoMP (coordinate multi point), MU-MIMO (multi user-multiple input multiple output) and the like and degradation of PDCCH performance due to inter-cell interference. Moreover, in order to obtain a precoding gain and the like, channel estimation may be performed on the EPDCCH based on the DMRS contrary to the existing PDCCH based on the CRS.

EPDCCH transmission may be classified into localized EPDCCH transmission and distributed EPDCCH transmission depending on a configuration of a PRB (physical resource block) pair used for the EPDCCH transmission. The localized EPDCCH transmission represents a case that ECCEs used for a single DCI transmission are adjacent to each other in frequency domain. And, specific precoding may be applied to the localized EPDCCH transmission in order to obtain beamforming gain. For instance, the localized EPDCCH transmission may be based on consecutive ECCEs the number of which corresponds to aggregation level. On the other hand, the distributed EPDCCH transmission represents a transmission of one EPDCCH in a PRB pair separated in frequency domain. And, it has an advantage with regard to frequency diversity. For instance, the distributed EPDCCH transmission may be based on ECCE constructed with 4 EREGs included in each PRB pair separated in frequency domain. In case of a user equipment, one or two EPDCCH (PRB) sets may be configured through upper layer signaling and the like. And, each of the EPDCCH PRB sets is for one of the localized EPDCCH transmission and the distributed EPDCCH transmission. In case that two EPDCCH PRB sets exist, some/whole part of the two EPDCCH PRB sets may be overlapped to each other.

A base station may transmit control information by mapping the control information to REs of EREG assigned for EPDCCH in at least one EPDCCH PRB set. In this case, the EREG is used to define mapping of the control information to the REs and 16 EREGs (EREGs #0 to #15) may exist in one PRB pair. One ECCE may include 4 EREGs (or 8 EREGs in some cases). One EPDCCH may include x of EREGs (x is set to one of 1, 2, 4, 8, 16 and 32). In case of the distributed EPDCCH transmission, one ECCE may include EREGs existing in several PRB pairs for diversity. In more detail, in case of the distributed EPDCCH transmission, EREG-to-ECCE mapping (hereinafter referred to as $1^{st}$ ECCE number-EREG number-PRB number relation) may represent that 'an ECCE index in the EPDCCH PRB set corresponds to an EREG index $$\left\lfloor \frac{n_{ECCE}}{N_P} \right\rfloor + i * N_{CP}$$

in a PRB pair index $$\left( n_{ECCE} + i * \max\left(1, \left\lfloor \frac{N_P}{N} \right\rfloor \right) \right) \bmod N'_P.$$

Figure 8:
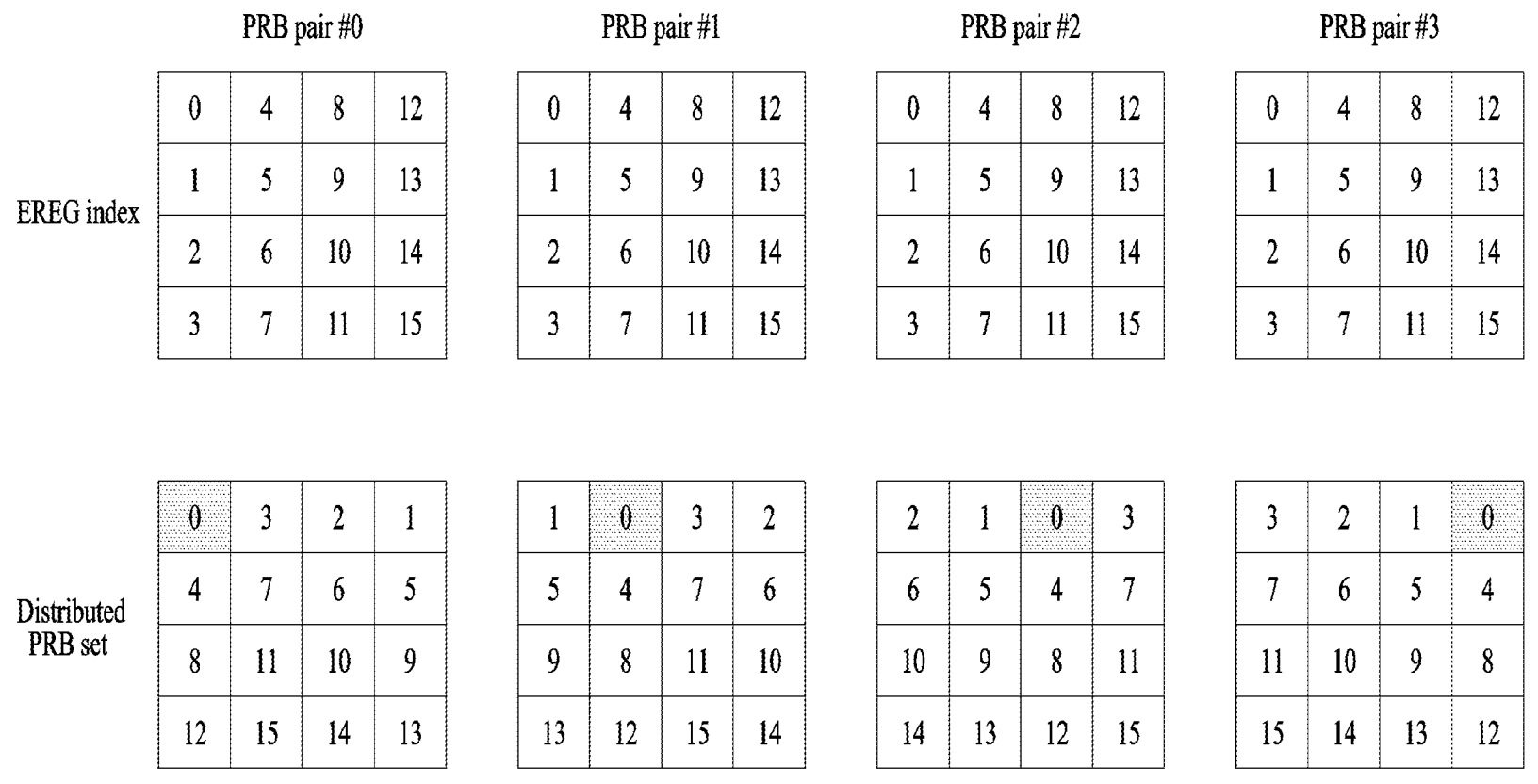

In this case, the N denotes the number of EREGs per ECCE, $N_{CP}$ denotes the number of ECCEs per PRB pair, $N_{P,set1}$ denotes the number of PRB pairs of a $1^{st}$ EPDCCH PRB set, $N_{P,set2}$ denotes the number of PRB pairs of a $2^{nd}$ EPDCCH PRB set, and i=0, 1, . . . , N−1. For instance, in case that 4 PRB pairs are included in an EPDCCH PRB set, ECCE index #0 is configured with EREG #0 of PRB pair #0, EREG #4 of PRB pair #1, EREG #8 of PRB pair #2, and EREG #12 of PRB pair #4 according to the above-mentioned $1^{st}$ ECCE number-EREG number-PRB number relation. The above EREG-to-ECCE mapping relation is shown in FIG. 8.

A user equipment may perform blind decoding similar to a conventional LTE/LTE-A system in order to receive/obtain control information (DCI) through EPDCCH. In more detail, the user equipment may attempt to perform decoding (monitoring) on a set of EPDCCH candidates per aggregation level for DCI formats corresponding to configured transmission modes. In this case, the set of the EPDCCH candidates that becomes a target for monitoring may be called an EPDCCH UE specific search space and the search space may be configured/constructed per aggregation level. Moreover, the aggregation level may become {1, 2, 4, 8, 16, 32} depending on a subframe type, a length of CP, an available resource amount in a PRB pair and the like slightly different from the aforementioned conventional LTE/LTE-A system.

In case of EPDCCH configured UE, REs included in the PRB pair is indexed with EREG and the EREG may be indexed by ECCE unit again. The UE determines an EPDCCH candidate included in the search space based on the indexed ECCE and then performs the blind decoding, whereby the UE may receive control information.

After having received the EPDCCH, the user equipment may transmit ACK/NACK in repose to the EPDCCH on PUCCH. In this case, an index of a used resource i.e., a PUCCH resource may be determined by an index of ECCE having a lowest index among ECCEs used for an EPDCCH transmission. In particular, it can be represented as Formula 3 in the following.

$$n_{PUCCH\text{-}ECCE}^{(1)} = n_{ECCE} + N_{PUCCH}^{(1)} \quad \text{[Formula 3]}$$

In Formula 3, $n_{PUCCH\text{-}ECCE}^{(1)}$ denotes the PUCCH resource index, $n_{ECCE}$ denotes the index of the ECCE having the lowest index among the ECCEs used for the EPDCCH transmission, and $N_{PUCCH}^{(1)}$ (it may be expressed as $N_{PUCCH,EPDCCH}^{(1)}$) denotes a starting point of the PUCCH resource index as a value transmitted through upper layer signaling.

However, if PUCCH resource indices are uniformly determined according to the above-mentioned Formula 3, a resource collision problem may occur. For instance, in case that two EPDCCH PRB sets are configured, a lowest ECCE index of one EPDCCH PRB set may be identical to that of another EPDCCH PRB set since ECCE indexing of the two EPDCCH PRB sets is independent from each other. In this case, the above-mentioned problem may be solved in a manner of making a starting point of a PUCCH resource different for each user. However, if the starting point of the PUCCH resource is different for each user, it may be inefficient since a lot of PUCCH resources are reserved. Moreover, in case of the EPDCCH, since DCIs of a plurality of users may be transmitted in the same ECCE location like MU-MIMO, a method of allocating a PUCCH resource is required. To solve the above-mentioned problem, an HARQ-ACK resource offset (ARO) has been introduced. The ARO enables a collision between PUCCH resources to be avoided by shifting a lowest ECCE index among ECCE indices included in the EPDCCH and a PUCCH resource determined by a starting offset of a PUCCH resource transmitted through upper layer signaling by prescribed degrees. The ARO is indicated through 2 bits of DCI format 1A/1B/1D/1/2A/2/2B/2C/2D and represented as Table 2 in the following.

TABLE 2

| ACK/NACK Resource offset field in DCI format 1A/1B/1D/1/2A/2/2B/2C/2D | $\Delta_{ARO}$ |
|---|---|
| 0 | 0 |
| 1 | −1 |
| 2 | −2 |
| 3 | 2 |

After having designated one of ARO values in Table 2 for a specific user equipment, a base station may inform the specific user equipment of ARO, which will be used in determining a PUCCH resource, through a DCI format. The user equipment detects an ARO field from its DCI format and may then transmit an acknowledgement through the PUCCH resource determined using the ARO value.

On the other hand, in such an environment in which a channel state is not significantly changed as a small cell or the like, a data transfer rate may be improved by reducing the DMRS overhead. More particularly, in a current LTE-A system, channel estimation is performed through DMRS in each subframe and EPDCCH/PDSCH is decoded based on a result of the channel estimation. If a channel state is very slowly changed or stable, the data transfer rate may be improved in a manner of using RE necessary for the DMRS in data transmission. In this case, the channel estimation can be performed through subframe bundling and details will be explained in the following description.

Subframe Bundling

Figure 9:
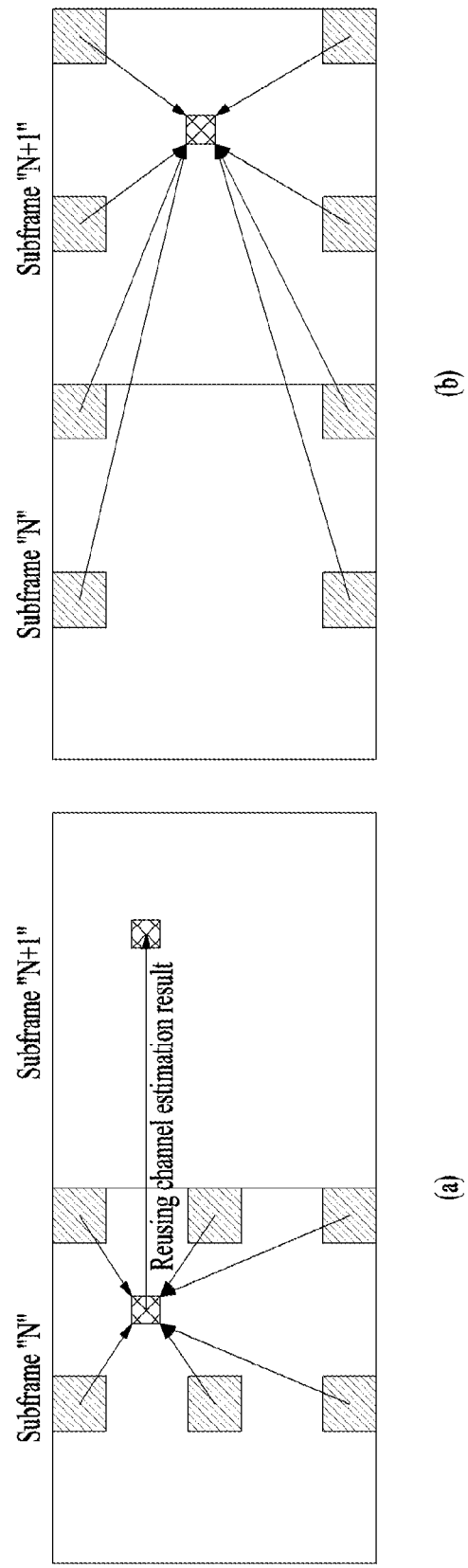
FIG. 9 is a diagram to describe a bundling type according to an embodiment of the present invention.

In an embodiment of the present invention, subframe bundling may include the meaning that DMRS of a previous subframe is used for channel estimation of a current subframe. In particular, if a subframe N and a subframe (N+L) (L>=1) are included in a subframe bundling group (SBG), a channel estimation related reference signal of the subframe N (e.g., DMRS or a portion of DMRS defined in a conventional LTE-A system) may be used for the channel estimation for blind decoding in the subframe (N+L). FIG. 9 shows an example of a type of the subframe bundling according to an embodiment of the present invention. In FIG. 9, it is assumed that the subframe N and the subframe (N+1) belong to one subframe bundling group. And, a shaded box means 4 DMRS REs. In this case, the DMRS RE may correspond to a modified form of the DMRS defined in the conventional LTE-A system i.e., the number of the DMRS REs and a position of the DMRS RE may be modified. In case of a subframe bundling type 1 shown in FIG. 9 (a), a channel estimation result drawn using the DMRS in the subframe N may be (equally) used in the subframe (N+1) bundled with the subframe N. Therefore, the DMRS may not be transmitted in the bundled subframe (N+1) and control/data information may be transmitted in RE, which becomes available due to no DMRS transmission in the subframe (N+1). If control information, for example, EPDCCH is mapped to the corresponding RE, a new mapping rule may be applied to the RE in which no DMRS is transmitted. For instance, in the subframe (N+1), EREG indexing (EREG to RE mapping) is performed on REs except the DMRS like the subframe N. In particular, after the above-mentioned EREG mapping is terminated, the EREG indexing may be performed on the REs that become available due to no DMRS transmission. In this case, even if the subframe bundling is applied, it may be prevented that the EREG indexing is significantly changed in each subframe. FIG. 9 (b) shows an example of a subframe bundling type 2. A user equipment performs channel estimation on the subframe N using the DMRS and may perform the channel estimation on the subframe (N+1) using all the DMRSs of the subframe N and the subframe (N+1). As shown in the drawing, a small number of DMRS REs may be used in the subframe bundling type 2 compared to DMRSs defined in the conventional LTE-A system. And, accuracy of the channel estimation can be considerably secured since the DMRS REs are shared by the bundled subframes as mentioned in the foregoing description.

UE Operation Related to Subframe Bundling

If the subframe bundling is applied to the above-mentioned subframe, the user equipment may perform the channel estimation according to a bundling type. In case of the subframe bundling, the use of a channel estimation result of a subframe belonging to SBG may mean that same precoding is applied to resources of the SBG. And, a search space (or a position of an EPDCCH candidate) may be same in each subframe of the SBG. Thus, preferably, the user equipment may assume that positions of EPDCCH candidates are same in subframes belonging to the SBG. To this end, positions of EPDCCH candidate in the subframe N and the subframe (N+1) belonging to the SBG may be randomized by an SBG related value instead of an existing subframe. More particularly, EPDCCH candidates can be determined by Formula 4 in the following.

$$L\left\{\left(Y_{p,k} + \left\lfloor \frac{m \cdot N_{ECCE,p,k}}{L \cdot M_p^{(L)}} \right\rfloor + b\right) \mod \lfloor N_{ECCE,p,k}/L \rfloor \right\} + i \quad \text{[Formula 4]}$$

In Formula 4, L denotes an aggregation level, $Y_{p,k}$ denotes an initial offset of a $k^{th}$ subframe in a $p^{th}$ EPDCCH PRB set, $M_p^{(L)}$ denotes the number of EPDCCH candidates for the aggregation level L in the $p^{th}$ EPDCCH PRB set, m (=0, 1, . . . $M_p^{(L)}$−1) denotes an order of EPDCCH candidates, $N_{ECCE,p,k}$ the number of ECCEs included in the $k^{th}$ subframe of the $p^{th}$ EPDCCH PRB set, $n_{CI}$ denotes a carrier index, i(=0, 1, . . . L−1) denotes an order of ECCEs included in specific EPDCCH, $N_{RB}^{S_m}$ denotes the number of RBs belonging to an EPDCCH PRB set ($S_m$), and $N_{RB}^{ECCE}$ denotes the number of ECCEs included in a single PRB pair.

In this case, a starting position of an EPDCCH candidate may be determined by $Y_{p,k}(A_p \cdot Y_{p,k-1}) \mod D$ (where, $k=\lfloor n_s/2 \rfloor$, $Y_{p,-1}=n_{RNTI} \neq 0$, $A_0=39827$, $A_1=39829$, $D=65537$, and $n_s$ indicates a slot number) and it means that the starting position of the EPDCCH candidate is randomized in each subframe. Therefore, in an embodiment of the present invention, the starting position of the EPDCCH candidate may be determined by either Formula 5 or Formula 6.

$$Y_{p,k}=(A_p \cdot Y_{p,k-1}) \mod D, \ k=\lfloor n_s/(2 \times SBG_{size}) \rfloor \quad \text{[Formula 5]}$$

$$Y_{p,k}=(A_p \cdot Y_{p,k-1}) \mod D, \ k=SBG_{index} \quad \text{[Formula 6]}$$

In Formula 5 and Formula 6, $SBG_{size}$ indicates a size of SBG and $k=SBG_{index}$ may correspond to an interval on which the subframe bundling is performed. In Formula 5, the $SBG_{size}$ may be indexed irrespective of a frame or reset if a frame is changed. The resetting in changing the frame may mean that an index is started from index 0 if the frame is changed. However, if the SBG exists across two consecutive frames, while a frame, which includes a $1^{st}$ subframe of the SBG, is changed, $SBG_{index}$ may be reset to 0.

Figure 10:
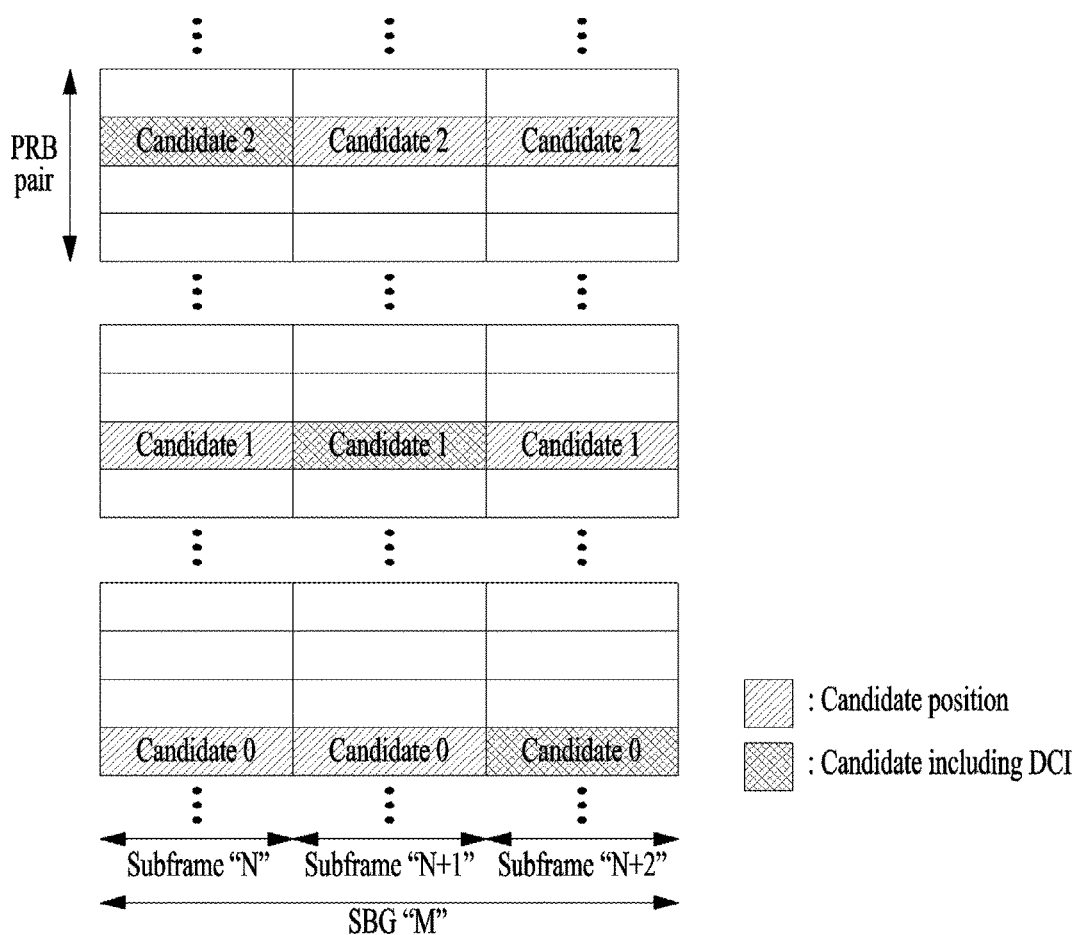
FIGS. 10 to 11 are diagrams to describe subframe bundling according to an embodiment of the present invention.

FIG. 10 shows an example of the above-mentioned subframe bundling. Referring to FIG. 10, it may be known that SBG corresponds to 3 and positions of EPDCCH candidates are equally maintained in the SBG. In case of the subframe bundling type 1, a user equipment may reuse a channel estimation result of a subframe N for a subframe (N+1) or a subframe (N+2). In case of the subframe bundling type 2, a user equipment may use all DMRSs corresponding to an EPDCCH candidate 2 of the subframe N and/or an EPDCCH candidate 2 of the subframe (N+1) in estimating a channel for an EPDCCH candidate 2 of the subframe (N+2).

The subframe bundling may be performed on a specific resource region/unit only. Particularly, the subframe bundling may be performed i) on ECCE including an EPDCCH candidate from which DCI is detected, ii) on a PRB pair including the EPDCCH candidate from which the DCI is detected, and/or iii) by unit of an EPDCCH (PRB) set including the EPDCCH candidate from which the DCI is detected. Details will be explained in the following description.

In case that the subframe bundling is performed on the ECCE including the EPDCCH candidate from which the DCI is detected, a channel estimation result of the subframe N in the SBG may be applied to only a PRB pair of a subframe (N+L) corresponding to a PRB pair, from which the DCI is detected, of the subframe N. Alternatively, if the DCI is detected from an EPDCCH candidate of an aggregation level 1, it may be interpreted as that the subframe bundling for a same antenna port at a corresponding resource location is limited. In case of localized EPDCCH, if an aggregation level is equal to or greater than 2, transmission is performed in a manner of selecting one antenna port (e.g., representative antenna port) among antenna ports assigned to ECCE. Thus, if DCI having the aggregation level equal to or greater than 2 is detected from the subframe N, it may be assumed that precoding, which is applied to an aggregation level 2 of a previous subframe, is performed on an EPDCCH candidate corresponding to ECCE of the aggregation level 2 in the subframe (N+L). In this case, an antenna port of the subframe N may be different from that of the subframe (N+L). The user equipment performs blind decoding on the subframe (N+L) by reusing the channel estimation result of the subframe N. In case that the DCI is not detected from the corresponding EPDCCH candidate, the user equipment may assume that no DCI is transmitted in the subframe (N+L). Alternatively, the user equipment may reuse a previous channel estimation result for an EPDCCH candidate, which corresponds to the EPDCCH candidate having the DCI detected therefrom of the subframe N, of the subframe (N+L). And, the user equipment may perform the channel estimation and the blind decoding on the rest of EPDCCH candidates.

In case that the subframe bundling is performed on the PRB pair including the EPDCCH candidate from which the DCI is detected, the channel estimation result of the subframe N is applied to only the PRB pair of the subframe (N+L) corresponding to the PRB pair, from which the DCI is detected, of the subframe N. In other words, it may be assumed that the same precoding as that performed on the corresponding PRB pair of the subframe (N+L) is performed on all antenna ports and/or all ECCE of the DCI detected PRB pair in the subframe N. For instance, it may be assumed that the same precoding is performed on DMRS transmitted through an antenna port (or ECCE) a in a PRB pair k of the subframe N and DMRS transmitted through an antenna port (or ECCE) b (c or d) in a PRB pair k of the subframe (N+1). Moreover, in case that PRB bundling is performed, the subframe bundling may be assumed for all antenna ports or all ECCEs (or candidates) in PRG including a PRB pair of a current subframe, which has the same index as that of the DCI detected PRB pair of the previous subframe.

The subframe bundling may be performed on the EPDCCH PRB set including the EPDCCH candidate from which the DCI is detected. In this case, the user equipment may reuse the channel estimation result for a resource region of the subframe (N+L), which corresponds to the DCI detected EPDCCH PRB set of the subframe N.

Figure 11:
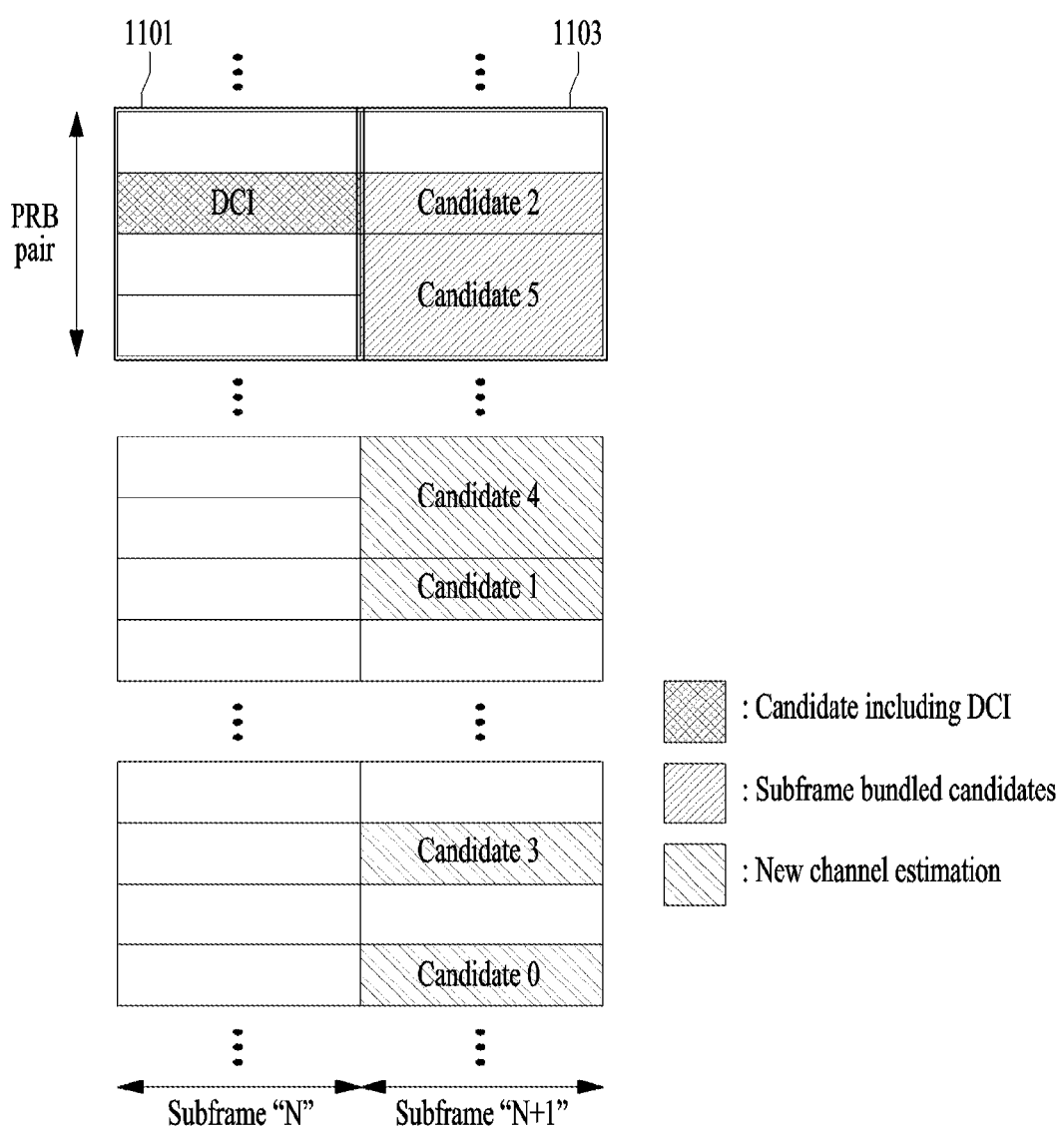

FIG. 11 shows an example of the subframe bundling for a specific resource region. Referring to FIG. 11, for EPDCCH candidates 2 and 5 included in a PRB pair 1103 of a subframe (N+1) corresponding to a PRB pair 1101, from which DCI is detected, of a subframe N, a channel estimation result of the subframe N may be used in a manner of applying the subframe bundling. In the above-mentioned case ii), i.e., if the subframe bundling is performed on the PRB pair including the EPDCCH candidate from which the DCI is detected as mentioned in the foregoing description, a channel estimation value for an EPDCCH candidate 5 in the subframe N may be reused for the channel estimation for the EPDCCH candidate 5. In the above-mentioned case i), i.e., if the subframe bundling is performed on the ECCE including the EPDCCH candidate from which the DCI is detected as mentioned in the foregoing description, the user equipment performs the channel estimation for the EPD- CCH candidate 5 separately and may reuse the channel estimation result, which is drawn through the previously detected DCI, for only the EPDCCH candidate 2.

When the subframe bundling is performed only on the specific resource region/unit in the subframe, the cases i) and ii) may be applied to localized EPDCCH and the case iii) may be applied to distributed EPDCCH. In case of the distributed EPDCCH, signaling for informing whether the subframe bundling is performed may have two kinds of meanings (or two independent signaling is possible). The first one may mean that the subframe bundling is performed by unit of a distributed EPDCCH set unit. And, it may mean that channel estimation values for ports 107 and 109 used in a previous subframe (or from which the DCI is detected) are applied to all PRB pairs in a current EPDCCH set (in particular, it may mean that the same precoding is performed on all PRB pairs in the distributed EPDCCH set and precoding, which is performed on the previous subframe, is performed on the current subframe). As the second one, it may mean that a range on which the subframe bundling is performed is limited to a PRB pair (or PRG) although the subframe bundling is performed (in particular, different precoding is performed on each PRB pair belonging to the distributed EPDCCH set but same precoding is performed on subframes corresponding to each other between the previous subframe and the current subframe (i.e., subframes having a same PRB pair (or PRG) index)). Subframe bundling information of a corresponding EPDCCH set may be signaled per EPDCCH set in order to inform the user equipment of the above-mentioned contents. In case of the distributed EPDCCH set, it may be signaled that the subframe bundling is performed either by set unit or by PRB pair (or PRG) unit. For one example, there are 3 states related to the subframe bundling for the distributed EPDCCH set. The 3 states may mean possibility of subframe bundling, subframe bundling by set unit and subframe bundling by PRB pair (or PRG) unit, respectively. For another example, it may be previously defined that the subframe bundling for the distributed EPDCCH set means one of the 2 states, which correspond to the subframe bundling by set unit and the subframe bundling by PRB pair (or PRG) unit. The possibility of the subframe bundling by corresponding unit may be indicated through information on whether the subframe bundling is performed.

Signaling of Information on Subframe Bundling

A user equipment may be aware of presence or non-presence of the subframe bundling, a bundling type, a subframe bundling region in time domain and/or frequency domain, an antenna port related to bundling and the like by receiving information on the subframe bundling.

The subframe bundling region may be signaled by subframe (set) unit in time domain. For instance, SBG corresponds to 4 and the presence or non-presence of the subframe bundling may be indicated through 10 bits of signaling by 40 ms unit. If an SBG size is greater than 2, i.e., bundling is performed on at least 3 subframes, SF in SFG for transmitting RS may be predefined or indicated through signaling and the like in order to perform the subframe bundling. For instance, if 3 consecutive subframes are set to SFG, it may be previously defined that RS is transmitted in the middle SF. Information for indicating that the subframe bundling is not performed may be included in a specific subframe (it may be previously defined that the subframe bundling is not performed). For instance, if the SBG size corresponds to 3 subframes (i.e., subframes #0, #1 and #2) and the information is transmitted in subframe #1, UE may assume that the subframe bundling is performed on subframes #0 and #2 (i.e., the subframe bundling may be performed on non-consecutive subframes). Alternatively, if a subframe on which the subframe bundling is unable to be performed is included in the SFG, UE may assume that the subframe bundling is not performed on the corresponding SFG.

Signaling units of the subframe bundling region in frequency domain may include a subframe, a PRB pair, a PRB pair set, a resource unit for EPDCCH (e.g., EREG, ECCE, ECPDDH set, etc.) and the like. In case of the subframe bundling region in frequency domain, association with a size of a precoding resource block group (PRG) may be considered. In particular, a PRG group on which the subframe bundling is able to be performed is designated and it may be assumed that the subframe bundling is performed only on a corresponding PRB group of a subframe included in the subframe bundling region in time domain. It has a distinguishing characteristic in that the conventional PRG means a frequency region on which the subframe bundling is able to be performed despite of a unit of PRB bundling (in particular, the subframe bundling performed in time domain may be limited in frequency domain).

A base station may signal that the subframe bundling is performed on a specific antenna port during the subframe bundling region.

Although the embodiments of the present invention are mainly described centering on EPDCCH, the embodiments of the present invention can be applied to PDSCH, CSS, EPHICH, EPCFICH and the like as well. in case that the subframe bundling for CSS, EPHICH and EPCFICH is signaled (or the subframe bundling for CSS, EPHICH and EPCFICH may be on/off by being interconnected with EPDCCH subframe bundling), it may be assumed that same precoding is performed on CSS, EPHICH, EPCFICH and the like transmitted in a subframe within a subframe bundling region. Similar to the EPDCCH related contents of the present invention, a resource region on which the same precoding is performed may be limited to a region (e.g., PRB pair, PRG, etc.) in which CSS, EPHICH, EPCFICH and the like are detected (it may mean that the case of using the condition of detected DCI and the case of detected CSS, EPHICH and EPCFICH in the above-mentioned description are operated in the same manner). On the other hand, it is difficult for UE to determine whether PHICH, PCFICH and the like are actually transmitted. Thus, in case that CSS, EPHICH and EPCFICH are not detected actually (or detected erroneously) despite of applying the above-mentioned condition (e.g., subframe bundling premised on detection of corresponding information), the subframe bundling cannot be used in a later subframe, whereby a problem may occur in channel estimation. As a method of solving the problem, if CSS, EPHICH and EPCFICH are configured (i.e., in an environment in which CSS, EPHICH and EPCFICH are transmitted (irrespective of the detection)), it may be assumed that the same precoding is performed on the corresponding resource region (e.g., resource region defined per information and/or antenna port) during the subframe bundling region at all times. Therefore, if CSS, EPHICH and EPCFICH are configured, UE assumes the subframe bundling for the corresponding resource region and/or the antenna port irrespective of whether the corresponding information is detected and may perform blind decoding. In this case, the corresponding resource region is not limited to a region in which the corresponding information is actually transmitted to specific UE but includes a common resource region which is monitored by a multitude of UEs monitor in performing the blind decoding on the corresponding information. Moreover, a resource region on which the subframe bundling is performed may be distinguished from a resource region to which the same precoding is applied. For instance, in case that N PRB pairs are configured for usage of EPCFICH, UE may apply the subframe bundling to the EPCFICH in the N PRB pairs. However, the region to which the same precoding is applied may be limited (or grouped) to a subset unit (e.g., each PRB pair (set), antenna port, etc.) of the N PRB pairs. In this case, the resource region to which the subframe bundling is applied may be indicated through upper layer signaling or previously defined as PRG size (PRG size may be limited to a case that PRB bundling is configured) or the like.

Device Configuration According to the Embodiments of the Present Invention

Figure 12:
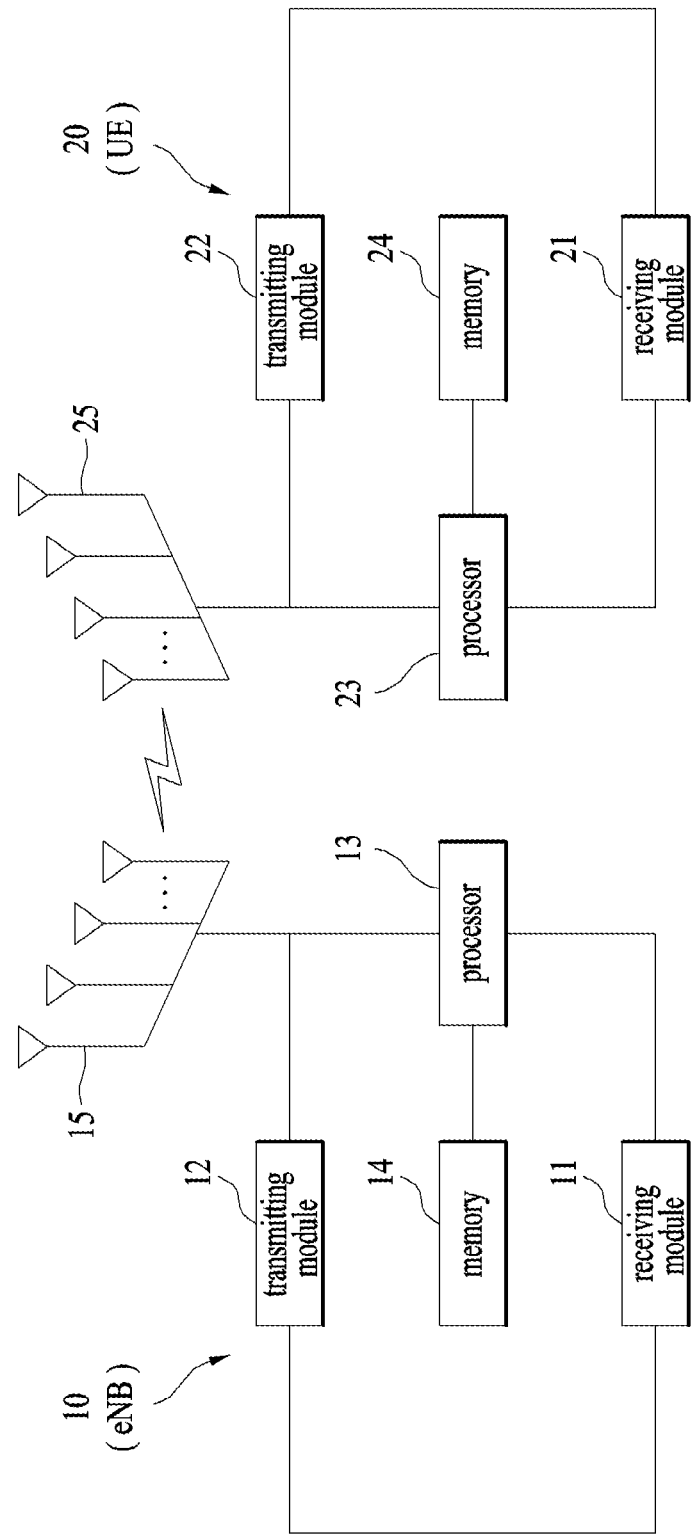
FIG. 12 is a diagram for configurations of transceiving devices.

FIG. 12 is a diagram for configurations of a transmitting point device and a user equipment device according to the present invention.

Referring to FIG. 12, a transmitting point device 10 according to the present invention may include a receiving module 11, a transmitting module 12, a processor 13, a memory 14 and a plurality of antennas 15. A plurality of the antennas 15 may mean a transmitting point device supportive of MIMO transmission and reception. The receiving module 11 can receive various signals, data and information in uplink from a user equipment. The transmitting module 12 can transmit various signals, data and information in downlink to the user equipment. And, the processor 13 can control overall operations of the transmitting point device 10.

The processor 13 of the transmitting point device 10 according to one embodiment of the present invention can process matters required for each of the embodiments mentioned in the foregoing description.

The processor 13 of the transmitting point device 10 performs functions of operating and processing information received by the transmitting point device 10, information to be externally transmitted by the transmitting point device 10, and the like. The memory 1114 can store the operated and processed information and the like for a prescribed period and can be substituted with such a component as a buffer (not shown in the drawing) and the like.

Referring to FIG. 12, a user equipment device 20 according to the present invention may include a receiving module 21, a transmitting module 22, a processor 23, a memory 24 and a plurality of antennas 25. A plurality of the antennas 25 may mean a user equipment device supportive of MIMO transmission and reception. The receiving module 21 can receive various signals, data and information in downlink from a base station. The transmitting module 22 can transmit various signals, data and information in uplink to the base station. And, the processor 23 can control overall operations of the user equipment device 20.

The processor 23 of the user equipment device 20 according to one embodiment of the present invention can process matters required for each of the embodiments mentioned in the foregoing description.

The processor 23 of the user equipment device 20 performs functions of operating and processing information received by the user equipment device 20, information to be externally transmitted by the user equipment device 20, and the like. The memory 24 can store the operated and processed information and the like for a prescribed period and can be substituted with such a component as a buffer (not shown in the drawing) and the like.

The above-mentioned detailed configurations of the transmitting point device 10 and the user equipment device 20 can be implemented so that the contents or items explained in the descriptions of the various embodiments of the present invention may be independently applied or at least two embodiments of the present invention may be simultaneously applied. And, redundant descriptions shall be omitted from the following description for clarity.

The description of the transmitting point device 10 with reference to FIG. 12 may be identically applicable to a relay node device as a downlink transmitting entity or an uplink receiving entity. And, the description of the user equipment device 20 with reference to FIG. 12 may be identically applicable to a relay node device as a downlink receiving entity or an uplink transmitting entity.

The embodiments of the present invention mentioned in the foregoing description can be implemented using various means. For instance, the embodiments of the present invention can be implemented using hardware, firmware, software and/or any combinations thereof In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforementioned embodiments of the present invention can be used by those skilled in the art in a manner of being combined with each other. Therefore, the present invention is non-limited by the embodiments disclosed herein but intends to give a broadest scope that matches the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description can apply to various kinds of mobile communication systems.

What is claimed is:

1. A method of receiving control information, which is received through an enhanced physical downlink control channel (EPDCCH) by a user equipment in a wireless communication system, the method comprising:
performing channel estimation on a subframe N;
performing blind decoding based on a result of the channel estimation; and
performing the blind decoding on a subframe (N+L), where L≥1,
wherein, if the subframe N and the subframe (N+L) are included in one subframe bundling group (SBG), a reference signal related to the channel estimation in the subframe N is also used for the channel estimation for the blind decoding in the subframe (N+L), and
wherein starting positions of EPDCCH candidates in the subframe N and the subframe (N+L) are randomized by one of a size of the SBG and an index of the SBG,
wherein a starting position of EPDCCH candidate $Y_{p,k}$ is determined by:

$(A_p \times Y_{p,k-1}) \bmod D$, where D and $A_p$ are predetermined constants and p is an EPDCCH-PRB-set number,
wherein for the size of the SBG, k is calculated by dividing a slot number by two times the size of the SBG, and
wherein for the index of the SBG, k is equal to $SBG_{index}$, which is the index of the SBG in a subframe bundling performed interval.

2. The method of claim 1, wherein the user equipment assumes that a position of an EPDCCH candidate in the subframe N is identical to that in the subframe (N+L).

3. The method of claim 1, wherein the starting positions of the EPDCCH candidates are identical in the SBG.

4. The method of claim 1 wherein,
$A_p$ $Y_{p,k-1}$ D
$k=\lfloor n_s/(2 \times SBG_{size}) \rfloor$, $Y_{p,-1}=n_{RNTI} \neq 0$, $A_0=39827$, $A_1=39829$, D=65537, $n_s$ is a slot number, and $SBG_{size}$ is the size of the SBG.

5. The method of claim 1 wherein,
$A_p$ $Y_{p,k-1}$ D $k=SBG_{index}$, $Y_{p,-1}=n_{RNTI} \neq 0$, $A_0=39827$, $A_1=39829$, D=65537, and $n_s$ is a slot number.

6. The method of claim 5, wherein if a frame including a first subframe of the SBG is changed, $SBG_{index}$ is reset to 0.

7. The method of claim 1, wherein if bundling is performed in the SBG by a unit of a downlink control information (DCI) detected physical resource block (PRB) pair, the result of the channel estimation in the subframe N is applied to only the PRB pair in the subframe (N+L) corresponding to the DCI detected PRB pair in the subframe N.

8. The method of claim 1, wherein if bundling is performed in the SBG by a unit of a downlink control information (DCI) detected enhanced control element (ECCE), the result of the channel estimation in the subframe N is applied to only the ECCE in the subframe (N+L) corresponding to the DCI detected ECCE in the subframe N.

9. The method of claim 8, wherein if the DCI is not detected from the ECCE of the subframe (N+L), the user equipment considers that there is no DCI for the user equipment.

10. The method of claim 1, further comprising receiving information related to subframe bundling.

11. The method of claim 10, wherein the information related to the subframe bundling comprises at least one selected from the group consisting of presence or non-presence of the subframe bundling, a size of the SBG, and information on time-frequency domain on which the subframe bundling is performed.

12. A user equipment in a wireless communication system, the user equipment comprising:
a receiving module; and
a processor coupled to the receiving module,
wherein the processor is configured to:
perform channel estimation on a subframe N,
perform blind decoding based on a result of the channel estimation, and
perform the blind decoding on a subframe (N+L), where L≥1, wherein, if the subframe N and the subframe (N+L) are included in one subframe bundling group (SBG), a reference signal related to the channel estimation in the subframe N is also used for the channel estimation for the blind decoding in the subframe (N+L), and
wherein starting positions of enhanced physical downlink control channel (EPDCCH) candidates in the subframe N and the subframe (N+L) are randomized by one of a size of the SBG and an index of the SBG,
wherein a starting position of EPDCCH candidate $Y_{p,k}$ is determined by:

$(A_p \times Y_{p,k-1}) \bmod D$, where D and $A_p$ are predetermined constants and p is an EPDCCH-PRB-set number,
wherein for the size of the SBG, k is calculated by dividing a slot number by two times the size of the SBG, and
wherein for the index of the SBG, k is equal to $SBG_{index}$, which is the index of the SBG in a subframe bundling performed interval.

* * * * *